June 14, 1960     C. E. BRANICK     2,940,124
CURING RIM FOR PNEUMATIC TIRE CASINGS
Filed June 18, 1958
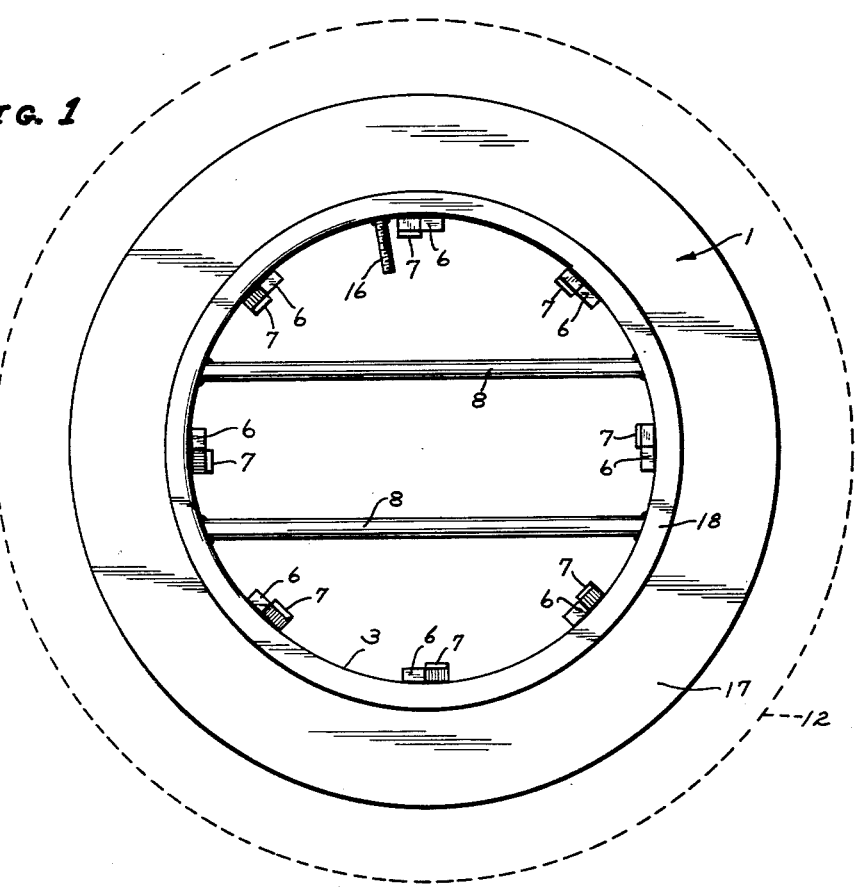
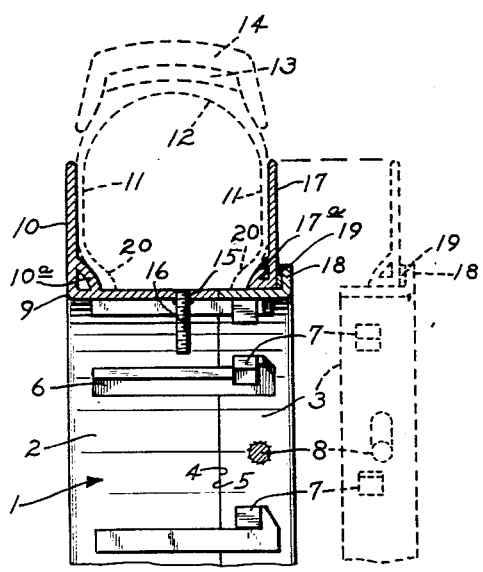
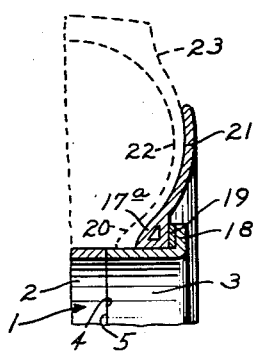
INVENTOR.
CHARLES E. BRANICK
BY
*Merchant & Merchant*
ATTORNEYS

United States Patent Office 2,940,124
Patented June 14, 1960

2,940,124

CURING RIM FOR PNEUMATIC TIRE CASINGS

Charles E. Branick, c/o Branick Manufacturing Co.,
P.O. Box 1937, Fargo, N. Dak.

Filed June 18, 1958, Ser. No. 742,905

1 Claim. (Cl. 18—45)

My invention relates to rims for pneumatic tire casings and more particularly to readily mountable and demountable sectional rims for use during the retreading of pneumatic tire casings while under inflation.

Still more specifically my invention relates to the provision of a curing rim for use in the application of "top caps" to pneumatic tire casings. In the application of such "top caps" relatively shallow retreading matrixes or bands are utilized such as shown in Patent 2,034,618. Because of the minimum amount of tire casing received within the cross section of bands of this character, slippage of the bands with respect to the casing during vulcanization (and the crooked treads which result therefrom), is a constant problem. In Patent 2,034,618, such slippage was largely prevented by the pressure plates which engaged opposite side walls of the tire.

The primary object of my invention is the provision of a novel curing rim for use in the application of "top caps" by the band method which is provided with side wall engaging pressure plates which equalize the pressures exerted by opposite sides of the tire against the band and hence obviate crooked treads by preventing shifting of the bands during the vulcanizing operation, and eliminate separate pressure plates.

A further object of my invention is the provision of a device of the class described which is inexpensive to produce, is extremely easy to mount and dismount and which is highly efficient in its operation.

The above and still further objects of my invention will become apparent from the following detailed specification, appended claim and attached drawings.

Referring to the drawings wherein like characters indicate like parts throughout the several views:

Fig. 1 is a view in side elevation of my novel rim;

Fig. 2 is a fragmentary view in vertical section; and

Fig. 3 is a fragmentary view corresponding to Fig. 2 but showing a slightly modified form of my invention.

Referring with greater particularity to the drawings, the numeral 1 indicates in its entirety a cylindrical rim comprising complementary felly-band-forming sections 2 and 3 which are provided with means for locking their axially inner ends 4 and 5 in abutting relationship as shown in Fig. 2. This means is in the nature of axially extended hooks 6 carried by the rim section 2 and cooperating lugs 7 welded to or otherwise rigidly carried by the radially inner surface of the rim section 3. For the purpose of imparting rotary movements to the relatively lighter and smaller rim section 3 with respect to the rim section 2, for purposes of causing locking or unlocking engagement of the hooks 6 and cooperating lugs 7, I provide a pair of spaced parallel transverse gripping bars 8 having their opposite ends welded or otherwise rigidly secured to the inner peripheral surface of the rim section 3.

As shown, the rim section 2 is formed at its axially outer end 9 to provide a preferably integral radially outwardly projecting pressure plate 10 which is adapted to engage the adjacent side wall 11 of a tire casing 12 received on the rim 1 during the vulcanization of a new tread 13 thereon in a band type "top cap" applicating mold 14. The fellyband-forming section 2 is provided with an aperture 15 for the snug reception of a conventional valve stem 16.

Slidably receivable upon the rim section 3 is a second annular pressure plate 17 which substantially matches the pressure plate 10. As shown, the pressure plate 17 engages the opposite side wall of the tire casing 12 and axially outer movements thereof with respect to the tire casing 12 are limited by engagement thereof with a relatively shallow stop flange 18 which projects radially outwardly from the axially outer end of the rim section 3.

Preferably and as shown, annular spacer shims or rings 19 are insertable between the lower end portion of the pressure plate 17 and the stop flange 18, whereby to vary the maximum spacing between the pressure plates 10, 17 to compensate for tires of varying cross-sectional dimensions, received therebetween.

It will be noted that the pressure plates 10, 17 of Figs. 1 and 2 are formed from flat stock and therefore flatten the side walls 11 of the tire casing 12 interposed therebetween. However, in order to insure substantially uninterrupted engagement of the pressure plates 10, 17 with the side walls 11 and the bead portions 20 thereof, the radially inner ends of the pressure plates 10, 17 are formed to provide opposed convex portions or ribs 10a and 17a respectively.

In the slightly modified form of my invention shown in Fig. 3, the pressure plates 21, only one being shown, are arcuate in cross section to conform substantially to the arcuate shape of the side wall 22 of the tire casing 23 there shown.

The pressure plates 10 and 17 or 21 engage the tire side walls over a considerable distance, but terminate short of the road engaging tread portion 13 as seen in Figs. 2 and 3.

I have found that with either of the slightly modified structures of Figs. 2 and 3, that equally satisfactory results are achieved, namely uniform pressure is exerted on opposed side walls of the tire casing being cured, thereby exerting uniform pressure against the band type mold 14 and preventing slippage thereof during curing.

My invention has been thoroughly tested and found to be completely satisfactory for the accomplishment of the above objects and while I have shown a preferred embodiment thereof, I wish it to be understood that same is capable of modification without departure from the scope and spirit of the appended claim.

What I claim is:

In a device for applying and vulcanizing top caps circumferentially to tire casings while equalizing and maintaining required lateral pressures to be exerted to opposite side walls of said tire thus supported in a capping mold; the improvement comprising a pair of cylindrical complementary axially separable fellyband-forming rim sections, means releasably locking said sections together with their axially inner ends in abutting relationship, one of said sections being formed to provide a relatively deep tire side wall engaging pressure plate which projects radially outwardly from its axially outer end, the other of said sections being formed to provide an integral relatively shallow annular stop flange which projects radially outwardly from its axially outer end, and a second annular side wall engaging pressure plate axially slidably receivable upon said other of said sections and limited in axially outward movements by uninterrupted engagement with said stop flange, said pressure plates providing one piece rigid substantially right angular side wall and bead engaging means and having cross-sectional contours assuring a substantially uninterrupted engagement thereof with the beads and side walls of a tire casing therebetween said pressure plates engaging the side walls for a considerable distance, but terminating short of the road engaging tread portion.

References Cited in the file of this patent
UNITED STATES PATENTS

| | | |
|---|---|---|
| 1,113,925 | Batcheller | Oct. 13, 1914 |
| 2,227,798 | Rihn et al. | Jan. 7, 1941 |
| 2,777,163 | Hawkinson | Jan. 15, 1957 |